United States Patent Office 3,296,162
Patented Jan. 3, 1967

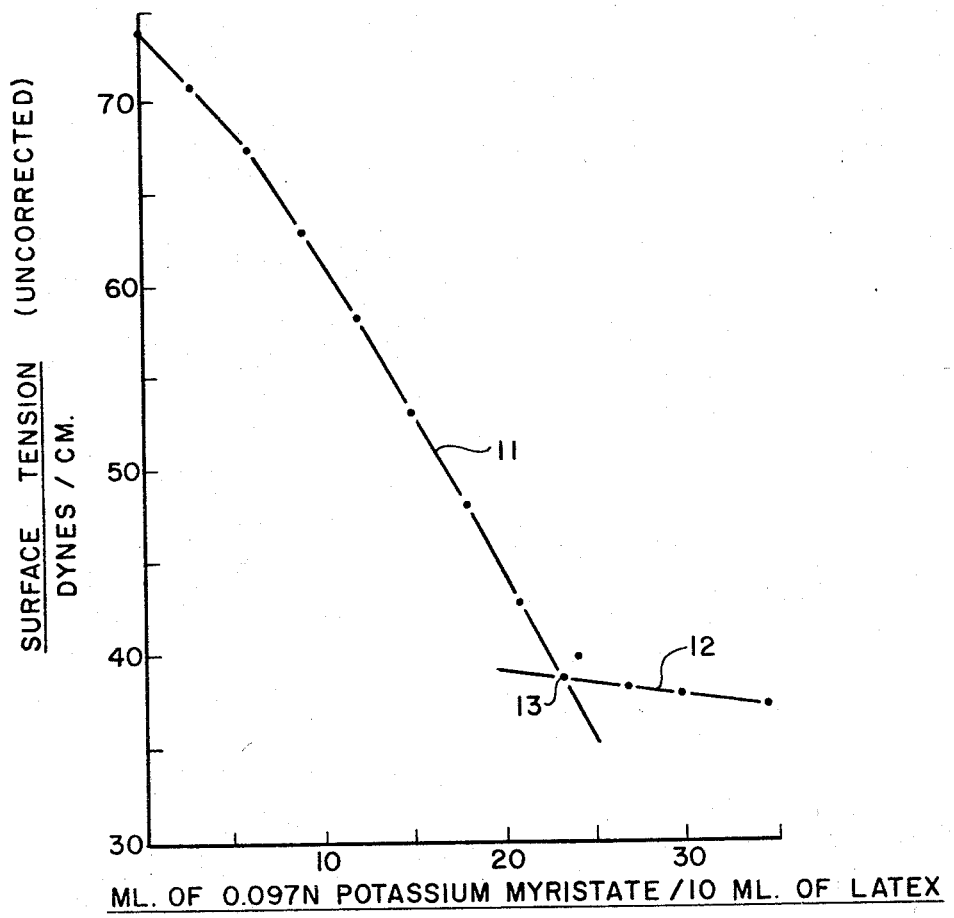

3,296,162
STABLE LATICES COMPRISING POLYETHYLENE PARTICLES COATED WITH EMULSIFYING AGENTS
Gerald J. Mantell and Arthur F. Helin, Kansas City, Mo., and Harry K. Stryker, Prairie Village, Kans., assignors, by mesne assignments, to Gulf Oil Corporation, Pittsburgh, Pa., a corporation of Pennsylvania
Filed Apr. 21, 1961, Ser. No. 104,711
14 Claims. (Cl. 260—23)

This invention relates to the stabilization of polyethylene latices, and to the latices so obtained.

Polyethylene latices prepared by the aqueous emulsion polymerization of ethylene in the presence of certain nonionic emulsifying agents are disclosed in copending patent application Serial No. 44,862, filed July 25, 1960 (now abandoned) and the continuation thereof, Serial No. 421,100, filed December 24, 1964. As disclosed in said copending application, these nonionic polyethylene latices are obtained by polymerizing ethylene in an aqueous medium at a temperature of about 60°–150° C., preferably at a temperature of from 70° C. to 100° C., at pressures between 2000–20,000 p.s.i., preferably between about 2500 to 450 p.s.i. The aqueous medium may contain an alcohol such as $t$-butanol in amounts of up to 35 percent by weight of the medium. Using an alkali metal persulfate initiator, such as potassium persulfate, generally in amounts of from 0.08 percent to 0.50 percent, polymerization proceeds in the presence of about 1 to 5 percent of a nonionic emulsifier, the percentages being based on the weight of aqueous medium. These nonionic emulsifiers are alkylphenoxy polyoxyethylene glycols of the formula

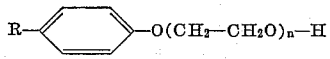

wherein R is an alkyl chain having 8 or 9 carbon atoms, advisably branched such as a polypropylene or polybutylene chain, and $n$ represents an average of 7 to about 15.

Polyethylene latices prepared by aqueous emulsion polymerization of ethylene in the presence of certain anionic emulsifying agents are disclosed in copending application Serial No. 104,763, filed on even date herewith. As disclosed in said copending application, these latices are produced by polymerizing ethylene in an aqueous medium at a temperature between about 70° C. and about 100° C. and at a pressure between about 2500 and about at least 5000 p.s.i. The aqueous medium, which may contain up to about 20 to 25 parts by weight of $t$-butanol, also may contain a pH adjuster such as tripotassium phosphate which maintains the pH of the aqueous medium at a value between about 8.5 and 10.5 in the presence of emulsifying salts of saturated fatty acids having 12–18 carbon atoms. Other emulsifiers are salts of sulfates of saturated fatty alcohols having about 12–18 carbon atoms, and salts of sulfates of ethoxylated saturated fatty alcohols having 12–18 carbon atoms and an average number of ethoxy groups between 1 and 5. An alkali metal persulfate initiator, such as potassium persulfate or sodium persulfate, is employed in concentrations of from about 0.06 to 0.5 percent by weight of the aqueous medium.

In view of the many details in these copending applications, it is not feasible to repeat their contents here, but these applications are incorporated herein by reference.

The present application discloses procedures by which the latices of the above-mentioned copending applications can be dramatically improved in their stability properties.

At least six types of stability desirable in a polyethylene latex can be outlined. First, such latices should be reactor-stable. That is, the latices should be capable of being produced in an emulsion polymerization in the form of a homogeneous product substantially free of coagulum and containing up to about 30 percent, preferably at least 20 percent, of polyethylene solids by weight of the product.

Second, such latices should be strip-stable. That is, the product from the reactor should be susceptible to concentration by removal of excess water and any solvent which may be present to produce commercially interesting concentrated latices containing a high concentration of solids, preferably at least 40 percent by weight. During this stripping step, there should be substantially no formation of floc, or only such slight formation, preferably less than 1 percent, as will permit easy filtration of such floc from the concentrated materials.

Also, latices may be characterized as to their chemical stability. In particular, latices produced with the aid of nonionic emulsifiers will be stable to acids and polyvalent metal cations added thereto, whereas latices produced with anionic emulsifiers will be coagulated by the reaction of acidic or cationic substances with the emulsifier employed. Only this very restricted definition of "chemical stability" is employed in this specification.

Another criterion of stability is mechanical stability. In many important industrial applications, for example coating processes, latices may be subjected to agitation or to frictional forces. Under such mechanical stress, the emulsified particles in a latex may tend to coalesce and form curdy agglomerates. A suitable test for mechanical stability in a polyethylene latex is the subjection of the latex to agitation for 1 minute in a Warning-type blender run at a rate of about 10,000 revolutions per minute. A latex containing about 20 percent solids after subjection to such agitation should be uncoagulated and capable of being diluted with water without separation of solids.

Still another criterion for stability is freeze-thaw stability. To test such stability, a latex sample is frozen and then thawed one or several times. If the latex is freeze-thaw stable, a latex with the initial properties of the unfrozen material is recovered after the first or subsequent cycles. In some cases, a product visibly similar to the unfrozen latex can be obtained, but the undesirable formation of solids can be detected by mixing the thawed latex with water. Freeze-thaw stability is of importance in storing and shipping latices, since the latices may be subjected to temperature extremes. Similarly, products, such as liquid polishes, made from freeze-thaw unstable latices may show undesirable freeze-thaw instability and require special handling in storage and shipping.

Finally, perhaps the most important stability property, but also the one least susceptible to precise definition, is shelf stability. Obviously, those products having the greatest resistance to creaming, gelling, or thickening will be most acceptable for marketing. For use in such processes as textile finishing, where the essential character of a polyethylene latex is destroyed, as by drying, in putting the latex to use, a minimum stability of 60 days is desirable for transportation and storage in the manufacturer's and consumer's inventory. In other uses, such as in polishes, latex shelf stability of 6 months or a year or more is desirable. The shelf stable latices of the copending applications mentioned above can be directly prepared by emulsion polymerization to meet all these requirements.

With reference to the stability properties hereinbefore discussed, the nonionic polyethylene latices disclosed in abandoned copending application Serial No. 44,862 and its continuation Serial No. 421,100, show reactor stability and strip stability, and have shelf stability and chemical stability. With few exceptions, all have mechanical stability, but lack freeze-thaw stability.

The anionic latices of copending application Serial No. 104,763 have reactor stability, strip stability, and shelf stability. However, the latices lack mechanical stability and freeze-thaw stability. Since they are anionic systems, they also lack chemical stability as hereinbefore defined.

In these shelf-stable products, particularly in the anionically emulsified latices, small flakes may form due to evaporation of surface portions of the stored latices. Although these flakes constitute only a minor portion of the total solids in the latex, probably only about 1 percent by weight of the solids, or less, and may not interfere with certain uses of the latex, they are aesthetically unpleasing. The presence of flakes can discourage the use of latices in which they are present in applications for which the latices are otherwise perfectly suitable.

According to the present invention, the nonionic and anionic polyethylene latices described above are improved in one or more of the following respects: (1) formation of flakes in otherwise stable products is inhibited, producing smooth, aesthetically attractive latices; (2) mechanical stability, a property of great importance for use of latices in coating, for example, is imparted to latices lacking such stability; and (3) freeze-thaw stability is imparted to the latices.

These important improvements are brought about in the nonionic and anionic latices by the addition to these latices of such amounts of a nonionic or anionic emulsifying agent, hereinafter referred to as the "stabilizer," "stabilizing agent," or "secondary emulsifier" as will, together with the primary emulsifying agent employed in the preparation of the latices, substantially completely cover or saturate the surface of the polyethylene particles in the latex. That is, substantially 100% of the available surface of these particles will be covered with a monomolecular layer of primary and secondary emulsifier.

The mechanism of emulsion polymerization, as well as economic considerations, militate against the direct production of substantially saturated polyethylene latices of the type which can be produced by the method of the present invention. Any attempt to keep the surface of emulsion polymer particles saturated by the initial addition to the polymerization medium of large quantities of emulsifier is unsuccessful. Any such large quantities of emulsifier initially present merely form additional micelles in the polymerization medium, and lead to the formation of large numbers of emulsion particles in the latex. As these particles grow in size during the course of polymerization, the emulsifier distributed over their surface becomes increasingly inadequate to maintain the particles in suspension until reactor stability is lost.

Although it is possible to terminate the emulsion polymerization at an early stage such that the latex particles produced will have a high concentration of emulsifying agent on the surface thereof, terminating polymerization at such a stage is economically undesirable. If the reaction is terminated at a point at which the area of the particles is in large part covered with emulsifier, the solids content of the resulting latices will be so small that concentration of the latices to a value at which they become of commercial interest is prohibitively costly.

From the economic viewpoint, thus, it is desirable to proceed with polymerization to the highest solids content compatible with reactor stability, which is in turn determined by the degree of particle surface coverage with emulsifier. This degree of coverage may be different for anionic systems and nonionic systems.

For example, the nonionic polyethylene latices disclosed in abandoned copending application Serial No. 44,862 and its continuation Serial No. 421,100 have a tendency to agglomerate if less than about 80 percent of the latex particles is covered with emulsifier. Consequently, such nonionic polymerizations are usually continued until the solids content of the latices produced is such that this point is not exceeded. Generally, these polymerizations are continued until the latices contain about 17–20 percent by weight of solids, though some solids contents as high as about 30 percent have been obtained. Average particle sizes are between 0.03 micron to 0.15 micron.

In the anionic system, the latices produced are inherently more stable and will show reactor stability when as little as 30 percent of the surface area of the emulsified particles is covered. Consequently, the anionic emulsion polymerization techniques disclosed in copending application Serial No. 104,763, described above, are carried out until the reactor latices contain about 20 to 30 percent by weight of solids, which corresponds to a degree of coverage of the particles' surface between 70 and 30 percent. Average particle sizes are between 0.02 micron and 0.5 micron.

In post-stabilizing latices of the type herein described according to the present invention, it is important that only so much stabilizer be added to the latices as will produce the substantial saturation desired. The addition of such amounts of stabilizing agent as are in excess of the amount required to saturate the particles is detrimental. In some cases, the addition of an excess of stabilizing agent will render the latices unstable, and cause a latex to form precipitated solids in large quantity. Unnecessarily large amounts of stabilizing agent cause increased foaming which is troublesome in subsequent handling of the latices, such as stripping. Excess stabilizer may undesirably thicken or gel the latices to which it is applied. Finally, as emulsifying agents are an important factor to be considered in the cost of producing a commercial product, the use of an excess of such stabilizers is wastefully expensive and economically undesirable. "Excess" emulsifier is defined as any amount of emulsifier in the aqueous medium of the latex which is in excess of the critical micelle concentration.

The emulsifying agents used as stabilizers in the present invention are generally the nonionic and anionic materials usable as primary emulsifiers in the formation of polyethylene latices. Thus, alkaryl polyoxyethylene glycols of the formula hereinbefore given to describe primary nonionic emulsifiers can be employed as stabilizers.

However, the materials used to post-stabilize latices of the type described are specific. Many common nonionic emulsifiers even some closely similar in structure to the materials defined above, may cause a coagulation of the latex. Thus, the addition of "Triton X-305," which is an alkaryl polyoxyethylene glycol of the following formula

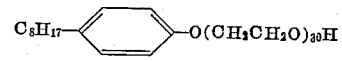

which is highly similar to the primary nonionic emulsifiers disclosed above, has caused coagulation of latices to which it has been added. Similarly, other commercially available emulsifying agents such as "Victamul 24C," and "Tween 60" (polyoxyethylene sorbitan monostearate) are suitable for use as stabilizers, since they may cause solidification of latices to which they are added.

As anionic post-stabilizing materials, the same fatty acid salts and salts of fatty alcohol sulfates, earlier disclosed as primary anionic emulsifying agents, can be employed. These include the sodium and potassium salts of saturated fatty acids having 12 to 18 carbon atoms, although the potassium salts are preferred, and pure or mixed alkyl sulfates of the type commercially available under the trade name "Duponol," containing principally $C_{12}$ alkyl chains.

Morpholinium oleate and salts of certain phosphoric acid fluoroalkyl esters have been found to be unique in imparting freeze-thaw stability when added to the polyethylene latices hereinbefore mentioned.

The nonionic stabilizers can be used to stabilize latices containing either a nonionic or anionic primary emulsifier. Similarly, the anionic stabilizers can be employed to stablize either the nonionic or anionic latices. However, since the addition of an anionic stabilizer to a latex containing a nonionic primary emulsifier may render the nonionic latex chemically unstable, as hereinbefore defined, it is usually desirable to stabilize nonionic latices with a nonionic stabilizer. However, for certain purposes, including the impartation of freeze-thaw stability, anionic stabilizers such as morpholinium oleate may be added to latices containing a nonionic primary emulsifier.

To proceed with the post-stabilization of nonionic or anionic polyethylene latices such that the particle surface is substantially saturated but no excess emulsifier is present, the degree of particle area coverage of the nonionic or anionically emulsified latices is first determined. This is most conveniently done by titration of a portion of the latex with a surfactant compatible with the latex. Most conveniently, this titration is carried out with the emulsifying agent to be used to post-stabilize the latex in question. However, any one of the emulsifiers hereinbefore described may be employed as titrating agents, even if it is an emulsifier different from that to be used in stabilizing the latex titrated. Even such surfactants may be employed as titrating agents as are unsuitable as stabilizing agents per se.

The titration involves a simultaneous determination of the surface tension of the solution being titrated and of the amount of titrating agent being added, as taught in the article by Maron et al., Journal of Colloid Science, 9, 89 (1954), where other variations of the procedure are also disclosed. Curves similar in shape to the curve shown in the figure are obtained. In that curve, surface tension has been plotted on the ordinate versus the amount of surfactant added. Generally, these curves show an initial portion of high slope indicated by reference numeral 11 in the figure. In this portion of the curve, an equilibrium between the surfactant dissolved in the latex and the amount of surfactant distributed on the particles in the latex is established as the surfactant is being added. As increasing quantities of surfactant are added, become dissolved in solution, and become distributed on the particles, a region of low slope is reached, indicated by reference numeral 12 of the figure. In the portion 12 of the curve, the surface of the polymer particles in the latex is substantially saturated, but excess surfactant is present. This additional surfactant, which is in excess of the critical micelle concentration (i.e., the concentration at which micelles just begin to form), forms increasing numbers of micelles in the solution, without substantial change in the surface tension of the solution.

To determine that point at which micelles are just forming, portions 11 and 12 of the curve shown in the figure are linearly extrapolated to their point of intersection (reference numeral 13). This point corresponds to substantial saturation of the polymer particles in the latex.

If the surfactant used to titrate the latex is the same as that used as the primary emulsifier in the system, the relative amounts of emulsifier used as the primary emulsifier and the amount of stabilizer used to bring the latex to saturation disclose the percent of available particle area in the latex before the titration, after allowance for the amount of emulsifier dissolved in the aqueous phase.

However, even if the surfactant used to titrate to determine the degree of coverage is different from the material used as a primary emulsifier, the degree of coverage can be easily determined by a knowledge of the relative covering powers of the two materials. Conversely, having determined the degree of coverage of the latex particles by titration with any surfactant, the unsaturated latex can be brought to saturation by the addition of any suitable stabilizing agent with a knowledge of the relative covering powers of the surfactant titrating agent and the stabilizer chosen.

Since bringing the particles to saturation is, in essence, the process of covering the particles with a substantially monomolecular layer of one or more surfactants, the area effectively occupied on the particle surface by one molecule of the various surfactants (that is, the covering power of the surfactant) can be used to determine the amount of surfactant necessary to saturate the surface.

Below are given the covering powers, expressed as square Angstroms per molecule, of some of the stabilizers suitable for use in the present invention.

| | $A^2$/Molecule |
|---|---|
| "Duponol C"* | 24 |
| "Triton N–101" | 66 |
| "Triton X–100" | 66 |
| "Triton X–165" | 147 |
| "Triton N–128" | 100 |
| "Tergitol NPX" | 66 |
| "Igepal CO–730" | 100 |
| Stearate soaps | 23 |
| Laurate soaps | 41 |
| Myristate soaps | 34 |
| Oleate soaps | 28 |
| Palmitate soaps | 25 |

*"Duponol C" is the trade name for sodium lauryl sulfate.

The "Triton" series has the formula $$R-\langle\phantom{xx}\rangle-O(CH_2CH_2)_nH$$

| | | |
|---|---|---|
| "Triton N–101" | $R=C_9H_{19}$ | $n=10$ |
| "Triton X–100" | $R=C_8H_{17}$ | $n=10$ |
| "Triton X–165" | $R=C_8H_{17}$ | $n=16.5$ |
| "Triton N–128" | $R=C_9H_{19}$ | $n=12$–$13$ |
| "Tergitol NPX" | $R=C_9H_{19}$ | $n=10$ |
| "Igepal CO–730" | $R=C_9H_{19}$ | $n=13$–$14$ |

Evidently, by forming ratios between the covering power values expressed above, relative covering powers between any two stabilizing materials can be determined.

With a knowledge of the covering power of the titrating agent relative to that of any other stabilizer, the amount of the latter required to bring the particles to saturation can be easily calculated.

Although the titration method above described is most convenient and simplest for determining the percent of particle area covered in a polyethylene latex, it is not the only method which can be used to determine this fact. For example, an independent determination of the size of the latex particles may be made, such as by electron microscopy. With a knowledge of particle size and of the total polyethylene solids in the latex, the total area of the polyethylene solids can be determined. With a knowledge of the amount of primary emulsifier used in preparing the latex and of the absolute covering power of this emulsifier, the surface area covered by the primary emulsifier can be calculated and the degree of coverage determined by difference. Then, a suitable stabilizing agent of known covering power can be employed to bring up the degree of coverage to a value of substantially 100 percent, i.e., to saturation.

In post-stabilizing latices prepared with an anionic primary emulsifier, it is desirable to stabilize with an acid-free stabilizing agent such that the pH of the stabilized latex is kept at a value of at least 8.5. Such a pH value is desirable in preventing neutralization of the anionic salt stabilizers, with resultant loss of chemical stability.

The method of adding the stabilizing agent, once the degree of particle coverage and the amount of stabilizing agent to be added have been determined, is not critical to the invention. In general, the desired amount of stabilizing agent is merely incorporated into the latex to be stabilized, with agitation.

The latices earlier described can be post-stabilized as obtained from the reactor, or they can first be stripped of solvent and excess water, for example by evaporation under reduced pressure, and brought to a commercially interesting concentration of 40–50 percent. Still another possibility, particularly desirable if relatively insoluble stabilizing agents such as potassium myristate are added to stripped latices, is that stripped latices are post-stabilized and the relatively large amounts of water employed to dissolve the stabilizing agent added are then removed by re-stripping to decrease water content.

In the fully stabilized latices prepared according to the present invention, the total amount of emulsifier present in the post-stabilized latices depends to a large extent on the particle size of the polymer materials in the latex. For example, latex in which the particles are saturated and which contains 40 percent solids of an average particle size of about 0.03 micron may contain about 10 percent total weight of emulsifier, based on the weight of the latex. For a latex containing larger particles, for example, of an average size of 0.08 micron and a solids content of 40 percent, the emulsifier may amount to only about 6 percent by weight of the latex.

As mentioned earlier herein, the stabilizers added give mechanical stability to the anionic latices to which they are added, and may increase this stability in the nonionic latices. In both latex types, the formation of undesirable flakes, granules, and collaring in the latices is strikingly decreased.

It has also been found that the addition of morpholinium oleate or certain fluoroalkyl phosphate salts to the latices will impart freeze-thaw stability thereto. Latices stabilized with these emulsifiers will pass through one or more freeze-thaw cycles with recovery of the latices unchanged.

The fluoroalkyl phosphate salts are soluble salts of the materials taught in U.S. Patent 2,597,702. These materials are phosphates of fluoroalcohols taught in U.S. Patent 2,559,628. In particular, salts of phosphates of a mixture of the $C_7$ and $C_{11}$ fluoroalcohols $$H(CF_2-CF_2)_3CH_2OH$$

and $$H(CF_2-CF_2)_5CH_2OH$$

have been particularly effective in imparting freeze-thaw stability.

Morpholinium oleate or the fluoroalkyl phosphates will impart freeze-thaw stability when used to bring partially covered latex particles to substantial saturation. However, the fluoro-compound will impart freeze-thaw stability if added to a latex post-stabilized with another stabilizing agent if added thereto in amounts of as little as 0.5 percent by weight of a 40 percent latex, that is as little as about 1 percent by weight of solids. This is of particular advantage since the fluoro-compound is expensive.

The stabilized latices of the invention are useful as components in liquid polishes, as textile treating agents, and for coating materials such as paper.

A better understanding of the invention and of its many advantages will be had by reference to the following specific examples, given by way of illustration.

*Example 1*

An unsaturated polyethylene latex was prepared according to Example 1 of copending application Serial No. 104,763 by charging an autoclave with a solution of 85.5 parts of distilled water, 9.5 parts of tertiary butanol, 2.90 parts of myristic acid, 0.71 part of potassium hydroxide, and 0.42 part of tripotassium phosphate. With the autoclave at 80° C., polymerization grade ethylene was introduced into the autoclave to bring the pressure to 1500 lb./sq. in. A solution consisting of 0.80 part of potassium persulfate dissolved in 5 parts of water was pumped in, and the pressure was increased to 3000 lb./sq. in. by pumping in more ethylene. The pressure and temperature were maintained at 3000 lb./sq. in. and 80° C. respectively until periodic sampling showed that polymerization had proceeded to a solids content of 25.4 percent in the latex product. The resulting fluid milky latex was stripped of tertiary butanol and concentrated by evaporation to 36.2 percent total solids.

Morpholinium oleate was used to post-stabilize the unsaturated latex as follows. Previously assayed oleic acid (3.07 grams) and morpholine (0.889 gram) were dissolved in water to a total volume of 100 ml. A 10-gram sample of the polyethylene latex was tensiometrically titrated with the morpholinium oleate solution. A plot of the uncorrected surface tension versus ml. of added morpholinium oleate indicated that the critical micelle concentration occurred on adding 20.0 ml. of the oleate solution. Consequently, each kilogram of the polyethylene latex described required 61.4 grams of oleic acid in the form of morpholinium oleate to saturate the surface of the polymer particles and the aqueous phase to the point of formation of micelles. Consequently, a concentrated solution of morpholinium oleate was prepared by slowly adding morpholine (212.7 grams) in 1 kilogram of water to a well-stirred dispersion of oleic acid (368.4 grams) in 2.5 kilograms of water at 75° C. An additional 68.2 grams of morpholine were necessary to produce a clear solution. While still hot, the oleate solution was stirred into 6.0 kilograms of latex described above which had been freshly filtered through cheesecloth. The latex was then concentrated in a film evaporator at a bath temperature of 30–60° C. at subatmospheric pressure. After filtration through felt, the latex had a total solids content of 39.8 percent.

To evaluate the degree of formation of aesthetically undesirable flake formation, the following visual rating score was employed and applied to latex samples stored in sealed transparent clear glass bottles.

Collar formation (formation of a layer of solids on the latex):

0=no collar
    1=discontinuous collar
    2=continuous collar less than 1/16 inch thick
    3=continuous collar less than 1/8 inch thick
    4=continuous collar more than 1/8 inch thick Flake formation (formation of a flaky scum on the latex surface):

0=none
    1=less than 10% of surface covered
    2=less than 50% of surface covered
    3=more than 50% of surface covered Sediment formation (formation of heavy particles at bottle bottom):

0=none
    2=bottle must be tiled to observe
    4=observable without tilting

Granulation (appearance of lumps in latex film as it drains from bottle wall):

0=none
    1=light
    2=moderate
    3=heavy

Wall-film formation (formation of deposits on bottle wall which are not dislodged by examination):

0=none
    2=some
    4=much

The appearance of a sample can be conveniently expressed as a single number which is the sum of the individual numerical ratings given in the 5 tests.

The polyethylene latex prior to post-stabilization with morpholinium oleate generally earned a visual score rating total of 8 to 10 after a period of storage amounting to approximately 50 days. The visual score given to the post-stabilized sample after a standing period of approximately 4 months had a total value of 3.

In addition to having an improved shelf stability, this saturated latex prepared by the post-addition of morpholinium oleate survived three cycles when put to the following freeze-thaw test. A three-ounce sample in a capped four-ounce bottle frozen at −5° C. for twenty-four hours and then thawed for twenty-four hours at room temperature appeared unchanged and showed no visible particles at high dilution with water. In view of the lack of freeze-thaw stability exhibited by polymer latices post-stabilized by saturating the surface of the polymer particles with potassium myristate (Example 2), the freeze-thaw stability observed in a sample of polyethylene latex post-stabilized in the same manner but using morpholinium oleate was completely unexpected.

*Example 2*

An unsaturated polyethylene latex was prepared according to Example 13 of copending application Serial No. 104,763 by charging an autoclave with a solution of 79.5 parts of distilled water, 15.5 parts of tertiary butanol, 1.09 parts of myristic acid, 0.318 part of potassium hydroxide, and 0.42 part of tripotassium phosphate. Ethylene was introduced into the autoclave under pressure. A solution of 0.12 part of potassium persulfate in 5 parts of distilled water was pumped in. The pressure and temperature were maintained at 3000 lb./sq. in. and 80° C. respectively until polymerization had proceeded to a solids content of 26.4 percent in the latex product. The latex was stripped of tertiary butanol and concentrated by evaporation to 36.4 percent total solids.

The latex, comprising polyethylene solids having an average particle diameter of 0.08 micron, contained, according to the recipe used in the emulsion polymerization, potassium myristate amounting to 0.141 millimole per gram of polymer. A tensiometric titration of a sample of this latex revealed that an additional 0.29 millimole of potassium myristate was required to saturate the surface of the polymer particles to the point of formation of micelles in the aqueous phase. This shows that only 33 percent of the surface of the polymer particles was originally covered with emulsifier. Post-stabilization of 8.62 kilograms of the described unstabilized latex was accomplished by the addition of 2 liters of a solution containing 226.2 grams of myristic acid (assay=97.7 percent acid) and 54.3 grams of 100 percent potassium hydroxide. The resulting latex was evaporated to a total solids content of 40.0 percent. The unsaturated latex, after standing for a period of approximately 50 days, had a visual score of about 10. However, the post-stabilized latex of this example, after standing for a period of approximately 4 months, had a visual score of only 4.

In addition to imparting improved shelf stability to the polyethylene latexes, post-stabilization by the addition of sufficient emulsifier substantially to saturate the surface of the polymer particles also imparts to the latex vastly improved properties of mechanical stability. For example, the unsaturated latex used in this example coagulated after only 5 seconds of agitation in a Waring-type blender run at 10,000 r.p.m., whereas the latex containing saturated particles remained uncoagulated after more than 50 minutes.

The post-stabilized latex was not freeze-thaw stable.

*Example 3*

An unsaturated polyethylene latex was prepared according to Example 12 of copending application Serial No. 104,763 by charging an autoclave with 82.5 parts of distilled water, 12.5 parts of tertiary butanol, 1.77 parts of myristic acid, 0.51 part of potassium hydroxide, and 0.42 part of tripotassium phosphate. Ethylene was introduced into the autoclave under pressure. A solution of 0.12 part potassium persulfate in 5 parts of distilled water was pumped in. The pressure and temperature were maintained at 3000 lb./sq. in. and 80°–97° C. respectively until polymerization had proceeded to a solids content of 21.0 percent in the latex product. The latex was stripped of tertiary butanol and concentrated by evaporation.

To the latex, comprising polyethylene solids having an average particle diameter of 0.04 micron, and having a degree of coverage of the particle surface of about 36 percent (as determined by titration with a standard solution of potassium myristate as hereinbefore described), were added myristic acid (17.0 grams) and potassium hydroxide (4.9 grams, 85 percent) dissolved in 150 mililiters of hot (60° C.) water. The resulting latex was evaporated at reduced pressure to a total solids content of 44.8 percent. This latex diluted with an equal volume of water failed one freeze-thaw cycle when tested according to the procedure outlined in Example 1. The latex also failed one freeze-thaw cycle when diluted with an equal volume of one percent solutions of sodium lauryl sulfate ("Duponol C"), potassium myristate, ammonium omega-hydro $C_{11}$ perfluoro carboxylate ("TLT 29"), sodium dihexyl sulfosuccinate ("Aerosol MA"), an octyl phenoxy ethanol ("Triton X–100"), or "Fluorochemical FC 128." However, when the latex was diluted with a one percent solution of the ammonium salts of a mixture of $C_7$ and $C_{11}$ fluoroalkyl phosphate esters ("ALT–13") the latex passed three cycles. The fluorinated phosphate esters useful for producing freeze-thaw stability are described in U.S. 2,597,702.

*Example 4*

To a portion of the unsaturated polyethylene latex described in Example 1 was added sufficient additional potassium stearate to cover approximately 70 percent of the particle surface area. The resulting latex was mixed well and filtered through a layer of 1/16 inch felt to remove flakes which had formed earlier due to surface evaporation in the original latex. After a period of 46 days, the latex was examined and rated on the visual score as follows: collar—4, flakes—3, granules—2, sediment—2, and wall film—4. The total of these ratings is 15. To another sample of the original latex was added sufficient potassium stearate to saturate the surface of the polymer particles. After mixing and filtering, the resulting latex was stored for a period of 51 days. The visual score given to this latex after this lapse of time were as follows: collar—1, flakes—0, granules—1, sediment—2, and wall film—2. The sum of these individual rating is 6. The polyethylene latex containing no additional emulsifier was given, at the end of 44 days, a total visual score of 11.

*Example 5*

Sufficient additional potassium myristate to cover about 66 percent of the surface of the polymer particles was added to a portion of the unsaturated polyethylene latex described in Example 2. The sample was well mixed and filtered through felt to remove flakes which had previously formed in the latex due to surface evaporation. After a period of 40 days, the sample was given the following visual scores: collar—1, flakes—3, granules—2, sediment—2, and wall film—4. The sum of these individual scores is 12. To another sample of the original latex was added sufficient potassium myristate to saturate the surface of the polymer particles. The visual rating on the resulting latex after mixing, filtering, and standing for 40 days, was as follows: collar—2, flakes—0, granules—2, sediment—2, wall film—0. The sum of these ratings is 6. At the end of 40 days, the polyethylene latex containing no additional emulsifier was given a total visual score of 10.

*Example 6*

To one portion of the unsaturated polyethylene latex described in Example 2 was added sufficient "Triton N–101" to cover about 66 percent of the surface of the polymer particles and to another was added sufficient "Triton N–101" to saturate the surface of the polymer particles. Each of the resulting latices was mixed, filtered through felt, and stored. After standing for a period of 51 days, the latex containing the unsaturated particles was rated as follows: collar—1, flakes—3, granules—1, sediment—2, and wall film—2. The total of these of these individual ratings is 9. After a period of 41 days, the latex containing the saturated particles was rated as follows: collar—1, flakes—1, granules—1, sediment—2, and wall film—2. The sum of these individual ratings is 7. The visual score for the latex containing no additional emulsifier was, after a period of 40 days, a total of 10.

*Example 7*

Sufficient "Triton X–100" to cover about 66 percent of the surface of the polymer particles was added to the unsaturated polyethylene latex described in Example 2. To another portion of the same latex was added sufficient "Triton X–100" to saturate the surface of the polymer particles. Each sample was mixed well, filtered through felt, and stored. After the lapse of 41 days, the latex containing the unsaturated polymer particles was rated visually as follows: collar—0, flakes—3, granules—1, sediment—2, wall film—2. The sum of these individual ratings is 8. After the same lapse of time, the latex containing the saturated polymer particles was rated as follows: collar—1, flakes—2, granules—1, sediment—0, and wall film—2. The sum of these individual ratings is 6. At the end of 40 days, the latex containing no additional emulsifier was given a total visual score of 10.

*Example 8*

Sufficient "Triton X–165" to cover about 70 percent of the surface of the polymer particles was added to the unsaturated polyethylene latex described in Example 1. To another portion of the same latex was added an amount of "Triton X–165" sufficient to saturate the surface of the polymer particles, as determined by tensiometric titration. The samples were mixed well and filtered. After a period of 51 days, the latex containing the unsaturated polymer particles was rated on the visual scale as follows: collar—4, flakes—3, granules—2, sediment—2, and wall film—4. The sum of these individual readings is 15. After a period of 50 days, the latex containing saturated polymer particles was rated by the visual scale as follows: collar—3, flakes—0, granules—1, sediment—0, and wall film—2. The sum of these individual ratings is 16. After a period of 44 days, a total visual score of 9 was given to the latex containing no additional emulsifier.

*Example 9*

The unsaturated polyethylene latex described in Example 2 was treated with sufficient sodium lauryl sulfate ("Duponol C") to saturate the surface of the polymer particles. Another portion of the same latex was treated with "Duponol C" to cover about 66 percent of the surface of the polymer particles. After a period of 40 days, the latex containing the unsaturated polymer particles was given visual scores as follows: collar—0, flakes—3, granules—2, sediment—2, and wall film—2. The total of these individual ratings is 9. After a period of 41 days, the latex containing the saturated polymer particles was given a visual score as follows: collar—2, flakes—1, granules—0, sediment—2, and wall film—2. The sum of these individual ratings is 7. At the end of 40 days, the latex containing no additional emulsifier received a total visual score of 10.

*Example 10*

To the unsaturated polyethylene latex described in Example 2 was added sufficient "Alrosol" (a fatty alkylol amide condensate of the Kritchevsky type) to cover about 66 percent of the surface of the polymer particles, and to another sample of the same latex was added sufficient "Alrosol" to saturate the surface of the polymer particles. The samples were well mixed, filtered through felt, and stored. After a period of 55 days, the latex containing the unsaturated polymer particles was rated visually as follows: collar—1, flakes—3, granules—2, sediment—2, and wall film—4. The sum of these individual ratings is 12. After a period of 54 days, the following visual scores were given to the latex containing the saturated polymer particles: collar—2, flakes—0, granules—0, sediment—2, and wall film—2. The sum of these individual ratings is 6. At the end of 44 days, latex containing no additional emulsifier earned a total visual score of 11.

*Example 11*

To a portion of unsaturated polyethylene latex described in Example 2, sufficient potassium stearate was added to cover about 66 percent of the surface of the polymer particles, and to another sample of the same latex was added sufficient potassium stearate to saturate the surface of the polymer particles. The samples were mixed well, filtered through felt, and stored. After standing for a period of 51 days, the latex containing the unsaturated polymer particles was rated as follows: collar—0, flakes—3, granules—2, sediment—2, and wall film—4. The sum of the individual ratings is 11. After standing for a period of 40 days, the latex containing the saturated polymer particles was rated visually as follows: collar—3, flakes—0, granules—1, sediment—0, and wall film—2. The sum of these individual ratings is 6. At the end of 40 days, latex containing no additional emulsifier was given a total visual score of 10.

Generally, the polyethylene latices of the foregoing examples and containing no added emulsifier had, after standing for a period of approximately 50 days, a visual rating of 9 to 10, due primarily to flakes and to wall film. Some of the samples containing added emulsifier to cover about 66 or about 70 percent of the surface of the polymer particles received poorer ratings than did a group of control samples receiving no additional emulsifier. Since there appeared to be no improvement in visual rating between about 30 percent coverage and about 70 percent coverage, the marked improvement exhibited in visual scores by the samples containing polymer particles having saturated surfaces was unexpected.

Although specific embodiments have been shown and described, it is to be understood that they are illustrative and not limiting on the scope and spirit of the invention.

We claim:

1. A shelf-stable and mechanically stable polyethylene latex comprising a plurality of particles of solid, substantially oxygen-free, substantially sulfur-free polyethylene suspended in an aqueous medium, said particles having an average particle size of from about 0.02 micron to about 0.5 micron, the surface of said particles being substantially saturated with at least one emulsifier selected from the group consisting of non-ionic and anionic emulsifiers.

2. A latex as in claim 1 wherein said particles are substantially saturated with at least one anionic emulsifier.

3. A latex as in claim 1 wherein said particles are substantially saturated with at least one non-ionic emulsifier.

4. A latex as in claim 1 wherein said particles are substantially saturated with at least one anionic emulsifier and at least one non-ionic emulsifier, in combination.

5. A latex as in claim 1 wherein said emulsifier includes a salt of a saturated fatty acid having 12–18 carbon atoms.

6. A latex as in claim 1 wherein said emulsifier includes a salt of a sulfate of a fatty alcohol having 12–18 carbon atoms.

7. A latex as in claim 1 wherein said emulsifier includes a compound of the formula

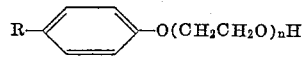

wherein R is an alkyl chain having 8 to 9 carbon atoms and *n* is an average of about 7 to about 15.

8. A latex as in claim 1 wherein said emulsifier includes morpholinium oleate.

9. A latex as in claim 1 wherein said emulsifier includes a soluble salt of a fluoroalkyl phosphate.

10. The method of stabilizing a polyethylene latex comprising a plurality of emulsified solid, substantially oxygen-free, substantially sulfur-free polyethylene particles suspended in an aqueous medium, said particles having an average particle size of from about 0.02 micron to about 0.5 micron, the surface of said particles being partially covered with an emulsifier, which method comprises covering the surface of said particles with emulsifier, substantially to saturate the surface of the particles, by the addition to the latex of additional emulsifier, said emulsifiers being selected from the group consisting of non-ionic and anionic emulsifiers.

11. The method as in claim 10 wherein said particles are substantially saturated with at least one anionic emulsifier.

12. The method as in claim 10 wherein said particles are substantially saturated with at least one anionic emulsifier and at least one non-ionic emulsifier, in combination.

13. The method as in claim 10 wherein said additional emulsifier is morpholinium oleate.

14. The method as in claim 10 wherein said additional emulsifier is a salt of a fluoroalkyl phosphate.

References Cited by the Examiner

UNITED STATES PATENTS

| | | | |
|---|---|---|---|
| 2,653,919 | 9/1953 | Hunter | 260—23 |
| 2,683,698 | 7/1954 | Bates | 260—29.7 |
| 2,874,137 | 2/1959 | Pisanchyn et al. | 260—23 |
| 2,912,350 | 11/1959 | Videen et al. | 260—29.6 |
| 2,928,797 | 3/1960 | Brunson et al. | 260—23 |

FOREIGN PATENTS 798,565   7/1958   Great Britain.

OTHER REFERENCES

Schildknecht: "Polymer Processes" (1956), pp. 152 and 153.

LEON J. BERCOVITZ, *Primary Examiner.*

MILTON STERMAN, DONALD E. CZAJA, *Examiners.*

T. D. KERWIN, R. A. WHITE, *Assistant Examiners.*